(12) United States Patent
Wang et al.

(10) Patent No.: US 11,538,385 B2
(45) Date of Patent: Dec. 27, 2022

(54) GATE DRIVING UNIT, GATE DRIVING CIRCUIT, GATE DRIVING METHOD AND DISPLAY DEVICE

(71) Applicant: BOE TECHNOLOGY GROUP CO., LTD., Beijing (CN)

(72) Inventors: Zhichong Wang, Beijing (CN); Guangcai Yuan, Beijing (CN); Fuqiang Li, Beijing (CN); Jing Feng, Beijing (CN); Xinglong Luan, Beijing (CN); Peng Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/355,858

(22) Filed: Jun. 23, 2021

(65) Prior Publication Data

US 2022/0130309 A1    Apr. 28, 2022

(30) Foreign Application Priority Data

Oct. 27, 2020    (CN) .......................... 202011163133.2

(51) Int. Cl.
*G09G 3/20*    (2006.01)
*G09G 3/36*    (2006.01)
(Continued)

(52) U.S. Cl.
CPC ............. *G09G 3/20* (2013.01); *G06F 3/0412* (2013.01); *G06F 3/0416* (2013.01); *G09G 3/3266* (2013.01); *G09G 3/3677* (2013.01); *G09G 2300/0426* (2013.01); *G09G 2300/0819* (2013.01); *G09G 2310/0267* (2013.01);
(Continued)

(58) Field of Classification Search
CPC ....... G09G 2310/0286; G09G 2310/08; G09G 2310/0267; G09G 3/3677; G09G 3/3266; G09G 3/3674; G09G 3/3648; G09G 3/3688; G09G 3/2092; G09G 2300/0819; G09G 2300/0426; G06F 3/0412; G06F 3/0416

See application file for complete search history.

(56) References Cited

U.S. PATENT DOCUMENTS 9,991,004 B2 *  6/2018  Yang ..................... G09G 5/003
10,222,904 B2 *  3/2019  Gu ....................... G06F 3/04166
(Continued)

*Primary Examiner* — Dismery Mercedes
(74) *Attorney, Agent, or Firm* — Muncy, Geissler, Olds & Lowe, P C.

(57) ABSTRACT

A gate driving unit includes: a pull-up node denoising circuit; a pull-down node control circuit; a pull-up node control circuit; and an energy storage circuit. The pull-up node denoising circuit is configured to, under control of a potential of the pull-down node, control coupling or discoupling between the first pull-up node and the input terminal. The pull-down node control circuit is configured to, under control of a control voltage, control the potential of the pull-down node; under control of a potential of the second pull-up node, control coupling or discoupling between the pull-down node and the input terminal. The pull-up node control circuit is configured to, under control of an anti-leakage control voltage, control coupling or discoupling between the first pull-up node and the second pull-up node, and configured to maintain the potential of the second pull-up node. The energy storage circuit is configured to store electric energy.

19 Claims, 8 Drawing Sheets

(51) Int. Cl.
*G09G 3/3266* (2016.01)
*G06F 3/041* (2006.01)

(52) U.S. Cl.
CPC . *G09G 2310/08* (2013.01); *G09G 2320/0204* (2013.01); *G09G 2330/02* (2013.01)

(56) References Cited

U.S. PATENT DOCUMENTS

| | | | | |
|---|---|---|---|---|
| 10,319,274 | B2* | 6/2019 | Huang | G11C 19/28 |
| 10,599,242 | B2* | 3/2020 | Dai | G02F 1/13454 |
| 10,892,028 | B2* | 1/2021 | Zhang | G09G 3/20 |
| 10,916,166 | B2* | 2/2021 | Lv | G09G 3/3677 |
| 11,081,058 | B2* | 8/2021 | Feng | G09G 3/3266 |
| 11,087,855 | B2* | 8/2021 | Li | G09G 3/3648 |
| 11,221,710 | B2* | 1/2022 | Su | G11C 19/28 |
| 11,289,039 | B2* | 3/2022 | Du | G09G 3/3674 |
| 2015/0317954 | A1* | 11/2015 | Jang | G09G 3/3677 |
| | | | | 345/82 |
| 2018/0046311 | A1* | 2/2018 | Gu | G06F 3/04184 |
| 2021/0193000 | A1* | 6/2021 | Ma | G06F 3/04166 |

* cited by examiner

GATE DRIVING UNIT, GATE DRIVING CIRCUIT, GATE DRIVING METHOD AND DISPLAY DEVICE

CROSS-REFERENCE TO RELATED APPLICATION

The present application claims a priority of the Chinese patent application No. 202011163133.2 filed on Oct. 27, 2020, which is incorporated herein in its entirety.

TECHNICAL FIELD

The present application relates to the field of display technologies, and in particular to a gate driving unit, a gate driving circuit, a gate driving method and a display device.

BACKGROUND

In a gate driving unit in the related art, there is a competitive connection between a pull-up node and a drop-down node, which results in problems that the gate driving unit in the related art has insufficient charging capacity for the pull-up node in an input phase, and cannot pull down a potential of the pull-down node in a time period between the input phase and an output phase.

SUMMARY

One embodiment of the present application provides a gate driving unit, including: a pull-up node denoising circuit; a pull-down node control circuit; a pull-up node control circuit; and an energy storage circuit. The pull-up node denoising circuit is electrically coupled to an input terminal, a pull-down node and a first pull-up node, respectively; the pull-up node denoising circuit is configured to, under control of a potential of the pull-down node, control coupling or discoupling between the first pull-up node and the input terminal. The pull-down node control circuit is electrically coupled to a second pull-up node, the pull-down node and the input terminal, respectively; the pull-down node control circuit is configured to, under control of a control voltage provided by a control voltage terminal, control the potential of the pull-down node; and under control of a potential of the second pull-up node, control coupling or discoupling between the pull-down node and the input terminal. The pull-up node control circuit is electrically coupled to an anti-leakage control terminal, the first pull-up node and the second pull-up node, respectively; the pull-up node control circuit is configured to, under control of an anti-leakage control voltage provided by the anti-leakage control terminal, control coupling or discoupling between the first pull-up node and the second pull-up node, and configured to maintain the potential of the second pull-up node. The energy storage circuit is electrically coupled to the second pull-up node and is configured to store electric energy.

One embodiment of the present application provides a gate driving circuit including multiple stages of foregoing gate driving units.

One embodiment of the present application provides a gate driving method including: under control of a potential of the pull-down node, controlling, by the pull-up node denoising circuit, coupling or discoupling between the first pull-up node and the input terminal; under control of a control voltage provided by the control voltage terminal, controlling, by the pull-down node control circuit, coupling or discoupling between the control voltage terminal and the pull-down node; and, under control of a potential of the second pull-up node, controlling, by the pull-down node control circuit, coupling or discoupling between the pull-down node and the input terminal; under control of an anti-leakage control voltage provided by the anti-leakage control terminal, controlling, by the pull-up node control circuit, coupling or discoupling between the first pull-up node and the second pull-up node, and maintaining the potential of the second pull-up node.

One embodiment of the present application provides a display device including the foregoing gate driving circuit.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

In a gate driving unit in the related art, there is a competitive connection between a pull-up node and a drop-down node. An input signal from an input terminal charges the pull-up node, the pull-up node pulls down a potential of the pull-down node through a pull-down thin film transistor (TFT), however, the pull-down node also pulls down a potential of the pull-up node through a denoising thin film transistor (TFT). When the potential of the pull-down node is high in an input phase, it will cause that the pull-up node cannot be charged and then no gate driving signal is output. Further, when the gate driving unit in the related art is in operation, in a time period between the input phase and an output phase (e.g., when a duty cycle of a clock signal used by the gate driving unit is not equal to 0.5, there will be a time period between the input phase and the output phase), the potential of the pull-up node will decrease due to current leakage, which causes occurrence of a situation in which the potential of the pull-down node cannot be controlled to be pulled down.

In view of this, the present application provides a gate driving unit, a gate driving circuit, a gate driving method and a display device, which can solve the problems that the gate driving unit in the related art has insufficient charging capacity for the pull-up node in an input phase, and cannot pull down a potential of the pull-down node in a time period between the input phase and an output phase.

Figure 1:
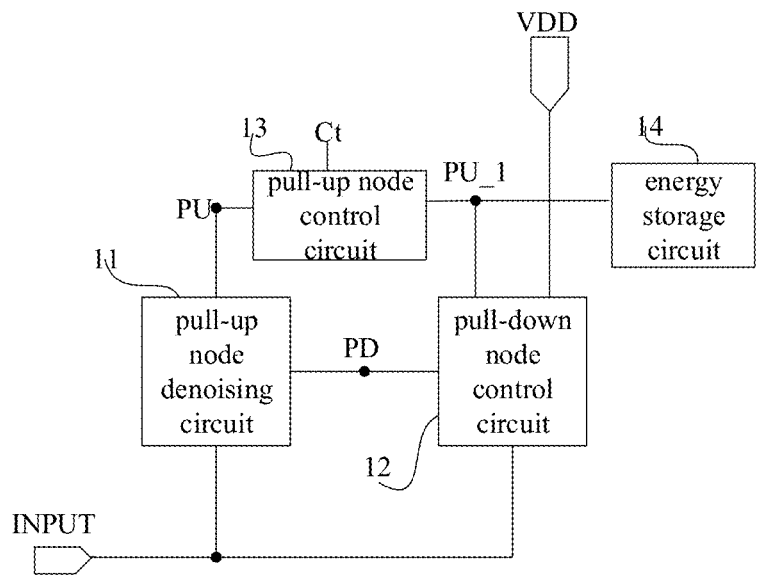
FIG. 1 is a schematic structural diagram of a gate driving unit according to an embodiment of the present application.

As shown in FIG. 1, a gate driving unit according to an embodiment of the present application includes a pull-up node denoising circuit 11, a pull-down node control circuit 12, a pull-up node control circuit 13 and an energy storage circuit 14.

The pull-up node denoising circuit 11 is electrically coupled to an input terminal INPUT, a pull-down node PD and a first pull-up node PU, respectively. The pull-up node denoising circuit 11 is configured to, under control of a potential of the pull-down node PD, control coupling or discoupling between the first pull-up node PU and the input terminal INPUT.

The pull-down node control circuit 12 is electrically coupled to a control voltage terminal VDD, a second pull-up node PU_1, the pull-down node PD and the input terminal INPUT, respectively. The pull-down node control circuit 12 is configured to, under control of a control voltage provided by the control voltage terminal VDD, control the potential of the pull-down node PD; and under control of a potential of the second pull-up node PU_1, control coupling or discoupling between the pull-down node PD and the input terminal INPUT.

The pull-up node control circuit 13 is electrically coupled to an anti-leakage control terminal Ct, the first pull-up node PU and the second pull-up node PU_1, respectively. The pull-up node control circuit 13 is configured to, under control of an anti-leakage control voltage provided by the anti-leakage control terminal Ct, control coupling or discoupling between the first pull-up node PU and the second pull-up node PU_1; and configured to maintain the potential of the second pull-up node PU_1.

The energy storage circuit 14 is electrically coupled to the second pull-up node PU_1 and is configured to store electric energy.

When the gate driving unit according to the embodiment of the present application is in operation, the pull-up node denoising circuit 11, under control of the potential of the pull-down node PD, controls coupling between the first pull-up node PU and the input terminal INPUT. In an input phase, the pull-down node control circuit 12, under control of the potential of the second pull-up node PU_1, controls the pull-down node PD to be electrically coupled to the input terminal INPUT, so that in the input phase, the potential of the pull-down node PD is maintained at a high voltage, thereby avoiding the problem of insufficient charging capacity for the pull-up node due to competition between the pull-up node and the pull-down node, and then better charging the first pull-up node PU in the input phase. Further, in the input phase, the pull-up node control circuit 13, under control of the anti-leakage control voltage provided by the anti-leakage control terminal Ct, controls coupling between the first pull-up node PU and the second pull-up node PU_1 to charge the energy storage circuit 14. Until the potential of the second pull-up node PU_1 rises to a certain value, the pull-up node control circuit 13 controls discoupling between the first pull-up node PU and the second pull-up node PU_1, thereby completing the charging of the second pull-up node PU_1. Moreover, when the gate driving unit according to the embodiment of the present application is in operation, in a time period between the input phase and an output phase (in the embodiment of the present application, when a duty cycle of a clock signal used by the gate driving unit is not equal to 0.5, there will be a time period between the input phase and the output phase), the pull-up node control circuit 13, under control of the anti-leakage control voltage, can prevent occurrence of a situation in which the potential of the pull-down node cannot be controlled as the potential of the second pull-up node PU_1 is reduced due to leakage.

In the embodiment of the present application, if the pull-up node control circuit 13 is not provided, in the time period between the input phase and the output phase, the potential of the first pull-up node PU would be decreased due to leakage, and then the potential of the pull-down node could not be pulled down, and the high voltage of the first pull-up node PU could not be maintained, resulting in failure of normal gate driving output.

The gate driving unit according to the embodiment of the present application may be, but is not limited to, based on oxide technology, or based on amorphous silicon (a-si) and low temperature ploy silicon (LTPS) technology.

Optionally, the pull-up node denoising circuit is electrically coupled to one pull-down node, and the pull-up node denoising circuit includes a pull-up node denoising transistor. A control electrode of the pull-up node denoising transistor is electrically coupled to the pull-down node. A first electrode of the pull-up node denoising transistor is electrically coupled to the pull-up node. A second electrode of the pull-up node denoising transistor is electrically coupled to the input terminal.

Alternatively, the pull-down node includes a first pull-down node and a second pull-down node; and the pull-up node denoising circuit includes a first pull-up node denoising transistor and a second pull-up node denoising transistor. A control electrode of the first pull-up node denoising transistor is electrically coupled to the first pull-down node. A first electrode of the first pull-up node denoising transistor is electrically coupled to the pull-up node. A second electrode of the first pull-up node denoising transistor is electrically coupled to the input terminal. A control electrode of the second pull-up node denoising transistor is electrically coupled to the second pull-down node. A first electrode of the second pull-up node denoising transistor is electrically coupled to the pull-up node. A second electrode of the second pull-up node denoising transistor is electrically coupled to the input terminal.

Optionally, the anti-leakage control terminal is the control voltage terminal or the pull-down node.

Figure 2:
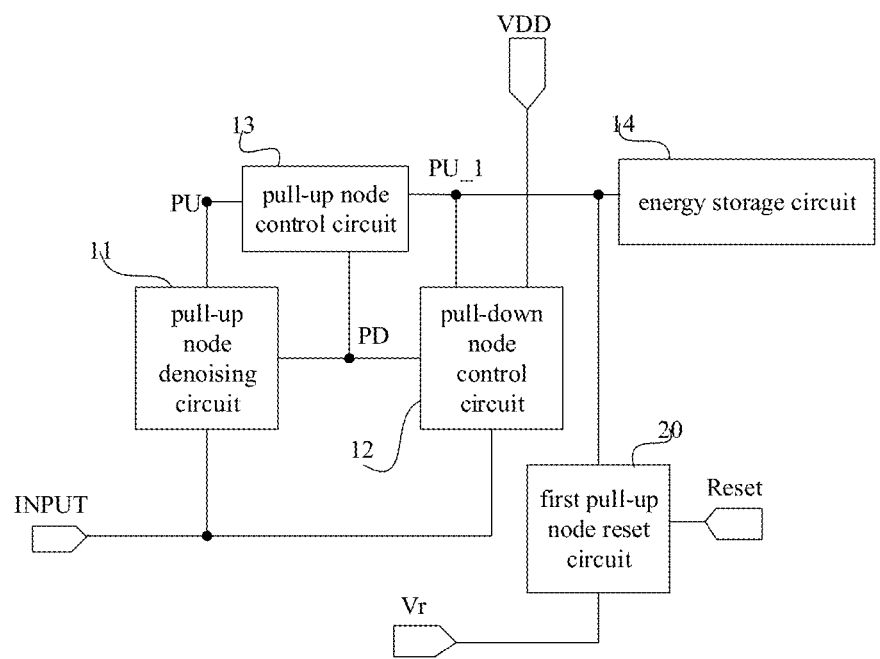
FIG. 2 is a schematic structural diagram of a gate driving unit according to another embodiment of the present application.

In a specific implementation, as shown in FIG. 2, in a case that the anti-leakage control terminal is the pull-down node PD, the gate driving unit further includes a first pull-up node reset circuit 20.

The first pull-up node reset circuit 20 is electrically coupled to a reset terminal Reset, the second pull-up node PU_1 and a reset voltage terminal Vr, respectively. The first pull-up node reset circuit 20 is configured to, under control of a reset signal provided by the reset terminal Reset, control coupling or discoupling between the second pull-up node PU_1 and the reset voltage terminal Vr.

In a specific implementation, in a case that the anti-leakage control terminal is the pull-down node, after an end of outputting a gate drive signal, if no first pull-up node reset circuit 20 is provided to reset the second pull-up node PU_1, then the potential of the second pull-up node PU_1 is still maintained at a high potential, which causes the potential of the pull-down node to be a low voltage, resulting in occurrence of a situation in which multiple gate drive signals are output.

When the gate driving unit shown in FIG. 2 of the present application is in operation, in a reset phase, under control of a reset signal, the first pull-up node reset circuit 20 controls coupling between the second pull-up node PU_1 and the reset voltage terminals Vr, to reset the potential of the second pull-up node PU_1.

Optionally, the reset voltage terminal Vr may be, but is not limited to, a first low-voltage terminal or the input terminal.

Optionally, the first pull-up node reset circuit 20 may include a first pull-up node reset transistor.

A control electrode of the first pull-up node reset transistor is electrically coupled to the reset terminal. A first electrode of the first pull-up node reset transistor is electrically coupled to the second pull-up node. A second electrode of the first pull-up node reset transistor is electrically coupled to the reset voltage terminal.

In a specific embodiment, the pull-up node control circuit may include a pull-up control transistor, and the energy storage circuit may include a storage capacitor.

A gate electrode of the pull-up control transistor is electrically coupled to the control voltage terminal or the pull-down node. A first electrode of the pull-up control transistor is electrically coupled to the second pull-up node. A second electrode of the pull-up control transistor is electrically coupled to the first pull-up node.

A first terminal of the storage capacitor is electrically coupled to the second pull-up node. A second terminal of the storage capacitor is electrically coupled to a gate driving signal output terminal.

In a specific implementation, in a case that the gate driving unit according to the embodiment of the present application only includes one pull-down node, the pull-up node control circuit may include only one pull-up control transistor. In this case, the control voltage terminal may be direct current voltage terminal, but not limited to this.

Figure 3:
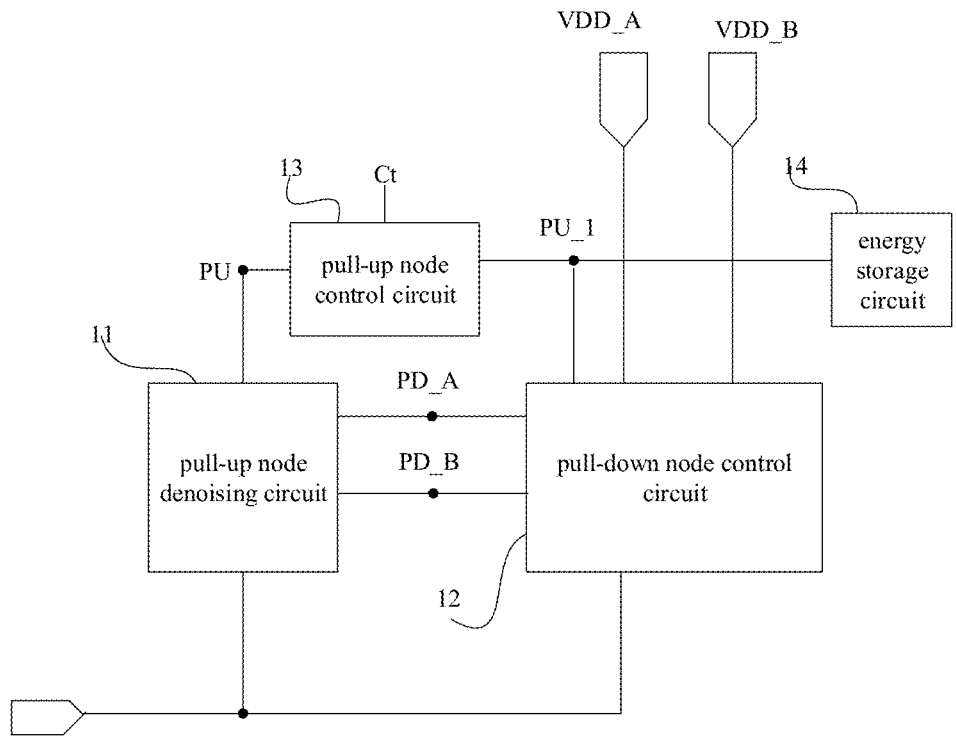
FIG. 3 is a schematic structural diagram of a gate driving unit according to yet another embodiment of the present application.

In the embodiment of the present application, as shown in FIG. 3, based on the embodiment shown in FIG. 1, the pull-down node includes a first pull-down node PD_A and a second pull-down node PD_B, and the control voltage terminal includes a first control voltage terminal VDD_A and a second control voltage terminal VDD_B.

The pull-down node control circuit 12 is electrically coupled to a first control voltage terminal VDD_A, a second control voltage terminal VDD_B, a second pull-up node PU_1, a first pull-down node PD_A, a second pull-down node PD_B, and the input terminal INPUT, respectively. The pull-down node control circuit 12 is configured to, under control of a first control voltage provided by the first control voltage terminal VDD_A, control a potential of the first pull-down node PD_A; under control of the second pull-up node PU_1, control coupling or discoupling between the first pull-down node PD_A and the input terminal INPUT; under control of a second control voltage provided by the second control voltage terminal VDD_B, control a potential of the second pull-down node PD_B; and under control of the second pull-up node PU_1, control the first pull-down node PD_A to be electrically coupled to the input terminal INPUT.

In a specific implementation, in a case that the gate driving unit according to the embodiment of the present application includes a first pull-down node and a second pull-down node, the gate driving unit employs the first control voltage terminal and the second control voltage terminal. When a first control voltage provided by the first control voltage terminal is a high voltage, a second control voltage provided by the second control voltage terminal is a low voltage; when the first control voltage is a low voltage, the second control voltage is a high voltage. In this way, a transistor controlled by the first control voltage terminal and a transistor controlled by the second control voltage terminal can operate alternately, thereby preventing the transistor controlled by the first control voltage terminal and the transistor controlled by the second control voltage terminal from being turned on for a long time, and then preventing drift of threshold voltages of the transistor controlled by the first control voltage terminal and the transistor controlled by the second control voltage terminal.

In the embodiment of the present application, every predetermined time (the predetermined time may be less than a display time of one frame, or greater than the display time of one frame, and the predetermined time may be set according to actual conditions), the first control voltage terminal and the second control voltage terminal alternately provide a high voltage. That is, when the first control voltage terminal provides a high voltage, the second control voltage terminal provides a low voltage; when the first control voltage terminal provides a low voltage, the second control voltage terminal provides a high voltage.

Optionally, the pull-up node control circuit includes a first pull-up control transistor and a second pull-up control transistor. The energy storage circuit includes a storage capacitor.

A control electrode of the first pull-up control transistor is electrically coupled to the first pull-down node. A first electrode of the first pull-up control transistor is electrically coupled to the second pull-up node. A second electrode of the first pull-up control transistor is electrically coupled to the first pull-up node.

A control electrode of the second pull-up control transistor is electrically coupled to the second pull-down node. A first electrode of the second pull-up control transistor is electrically coupled to the second pull-up node. A second electrode of the second pull-up control transistor is electrically coupled to the first pull-up node.

A first terminal of the storage capacitor is electrically coupled to the second pull-up node. A second terminal of the storage capacitor is electrically coupled to the gate driving signal output terminal.

When the control electrode of the first pull-up control transistor is electrically coupled to the first pull-down node and the control electrode of the second pull-up control transistor is electrically coupled to the second pull-down node, in the time period between the input phase and the output phase, since the potential of the first pull-down node and the potential of the second pull-down node are pulled down, a gate-source voltage of the first pull-up control transistor and a gate-source voltage of the second pull-up control transistor are small, and then a leakage current of the first pull-up control transistor and a leakage current of the second pull-up control transistor are small. Therefore, the pull-up node control circuit can well maintain the potential of the second pull-up node, and prevent the potential of the second pull-up node from falling too low.

Optionally, the pull-up node control circuit includes a first pull-up control transistor and a second pull-up control transistor. The energy storage circuit includes a storage capacitor.

A control electrode of the first pull-up control transistor is electrically coupled to the first control voltage terminal. A first electrode of the first pull-up control transistor is electrically coupled to the second pull-up node. A second electrode of the first pull-up control transistor is electrically coupled to the first pull-up node.

A control electrode of the second pull-up control transistor is electrically coupled to the second control voltage terminal. A first electrode of the second pull-up control transistor is electrically coupled to the second pull-up node. A second electrode of the second pull-up control transistor is electrically coupled to the first pull-up node.

A first terminal of the storage capacitor is electrically coupled to the second pull-up node. A second terminal of the storage capacitor is electrically coupled to the gate driving signal output terminal.

In a specific implementation, the control electrode of the first pull-up control transistor and the control electrode of the second pull-up control transistor may be electrically coupled to the first control voltage terminal and the second control voltage terminal, respectively, and may also play the effect of preventing the potential of the second pull-up node from falling too low in the time period between the input phase and the output phase.

According to a specific embodiment, the pull-down node control circuit may include a first pull-down control transistor, a second pull-down control transistor, a third pull-down control transistor, and a fourth pull-down control transistor.

A control electrode of the first pull-down control transistor and a first electrode of the first pull-down control transistor are both electrically coupled to the first control voltage terminal. A second electrode of the first pull-down control transistor is electrically coupled to the first pull-down node.

A control electrode of the second pull-down control transistor is electrically coupled to the second pull-up node. A first electrode of the second pull-down control transistor is electrically coupled to the first pull-down node. A second electrode of the second pull-down control transistor is electrically coupled to the input terminal.

A control electrode of the third pull-down control transistor and a first electrode of the third pull-down control transistor are both electrically coupled to the second control voltage terminal. A second electrode of the third pull-down control transistor is electrically coupled to the second pull-down node.

A control electrode of the fourth pull-down control transistor is electrically coupled to the second pull-up node. A first electrode of the fourth pull-down control transistor is electrically coupled to the second pull-down node. A second electrode of the fourth pull-down control transistor is electrically coupled to the input terminal.

According to another specific embodiment, the pull-down node control circuit may include a first pull-down control transistor, a second pull-down control transistor, a third pull-down control transistor, a fourth pull-down control transistor, a fifth pull-down control transistor, a sixth pull-down control transistor, a seventh pull-down control transistor and an eighth pull-down control transistor.

A control electrode of the fifth pull-down control transistor and a first electrode of the fifth pull-down control transistor are both electrically coupled to the first control voltage terminal.

A control electrode of the first pull-down control transistor is electrically coupled to a second electrode of the fifth pull-down control transistor. A first electrode of the first pull-down control transistor is electrically coupled to the first control voltage terminal. A second electrode of the first pull-down control transistor is electrically coupled to the first pull-down node.

A control electrode of the sixth pull-down control transistor is electrically coupled to the second pull-up node. A first electrode of the sixth pull-down control transistor is electrically coupled to the second electrode of the fifth pull-down control transistor. A second electrode of the sixth pull-down control transistor is electrically coupled to the input terminal.

A control electrode of the second pull-down control transistor is electrically coupled to the second pull-up node. A first electrode of the second pull-down control transistor is electrically coupled to the first pull-down node. A second electrode of the second pull-down control transistor is electrically coupled to the input terminal.

A control electrode of the seventh pull-down control transistor and a first electrode of the seventh pull-down control transistor are both electrically coupled to the second control voltage terminal.

A control electrode of the third pull-down control transistor is electrically connected to a second electrode of the seventh pull-down control transistor. A first electrode of the third pull-down control transistor is electrically coupled to the second control voltage terminal. A second electrode of the third pull-down control transistor is electrically coupled to the second pull-down node.

A control electrode of the eighth pull-down control transistor is electrically coupled to the second pull-up node. A first electrode of the eighth pull-down control transistor is electrically coupled to the second electrode of the seventh pull-down control transistor. A second electrode of the eight pull-down control transistor is electrically coupled to the input terminal.

A control electrode of the fourth pull-down control transistor is electrically coupled to the second pull-up node. A first electrode of the fourth pull-down control transistor is electrically coupled to the second pull-down node. A second electrode of the fourth pull-down control transistor is electrically coupled to the input terminal.

In actual operation, in the embodiment of the pull-down node control circuit, the control electrode of the first pull-down control transistor is electrically coupled to the first pull-down control node, and the control electrode of the third pull-down control transistor is electrically coupled to the second pull-down control node.

The first pull-down control node is controlled by the fifth pull-down control transistor and the sixth pull-down control transistor. The second pull-down control node is controlled by the seventh pull-down control transistor and the eighth pull-down control transistor.

When the gate driving unit according to the embodiment of the present application is in operation, in a case that the first pull-down control transistor, the second pull-down control transistor, the third pull-down control transistor, the fourth pull-down control transistor, the fifth pull-down control transistor, the sixth pull-down control transistor, the seventh pull-down control transistor and the eighth pull-down control transistor included in the pull-down node control circuit, are all n-type transistors, When the potential of the second pull-up node is a high voltage, the fifth pull-down control transistor and the sixth pull-down control transistor control the first pull-down control node to be at a low voltage, then the first pull-down control transistor is turned off, and the second pull-down control transistor is turned on, thereby ensuring that the potential of the first pull-down node is a low voltage, so as to prevent the problems that the potential of the first pull-down node cannot be pulled down sufficiently due to that both the first pull-down control transistor and the second pull-down control transistor are turned on when the potential of the second pull-up node is a high voltage in a case that the pull-down node control circuit only includes the first pull-down control transistor, the second pull-down control transistor, the third pull-down control transistor and the fourth pull-down control transistor.

When the potential of the second pull-up node is a high voltage, the seventh pull-down control transistor and the eighth pull-down control transistor control the second pull-down control node to be at a low voltage, then the third pull-down control transistor is turned off, and the fourth pull-down control transistor is turned on, thereby ensuring that the potential of the second pull-down node is a low voltage, so as to prevent the problems that the potential of the second pull-down node cannot be pulled down sufficiently due to that both the third pull-down control transistor and the fourth pull-down control transistor are turned on when the potential of the second pull-up node is a high voltage in a case that the pull-down node control circuit only includes the first pull-down control transistor, the second pull-down control transistor, the third pull-down control transistor and the fourth pull-down control transistor.

In the embodiment of the present application, the gate driving unit may further include a second pull-up node reset circuit.

The second pull-up node reset circuit is electrically coupled to the first pull-up node, and is configured to reset the potential of the first pull-up node in a reset phase.

Optionally, the second pull-up node reset circuit includes a second pull-up node reset transistor.

A control electrode of the second pull-up node reset transistor is electrically coupled to a first clock signal terminal. A first electrode of the second pull-up node reset transistor is electrically coupled to the first pull-up node. A second electrode of the second pull-up node reset transistor is electrically coupled to the input terminal.

In a specific implementation, the second pull-up node reset circuit may include a second pull-up node reset transistor. A control electrode of the second pull-up node reset transistor may be electrically coupled to a first clock signal terminal. At this point, a second electrode of the second pull-up node reset transistor needs to be electrically coupled to the input terminal, so that in the input phase, under control of a first clock signal provided by the first clock signal terminal, the first pull-up node is charged by an input signal from the input terminal; in the reset phase, under control of the first clock signal, the first pull-up node is reset by the input signal.

Optionally, the second pull-up node reset circuit includes a second pull-up node reset transistor.

A control electrode of the second pull-up node reset transistor is electrically coupled to a reset terminal. A first electrode of the second pull-up node reset transistor is electrically coupled to the first pull-up node. A second electrode of the second pull-up node reset transistor is electrically coupled to the input terminal or the first low-voltage terminal.

In a specific implementation, the second pull-up node reset circuit may include a second pull-up node reset transistor. A control electrode of the second pull-up node reset transistor may be electrically coupled to the reset terminal. At this point, a second electrode of the second pull-up node reset transistor may be electrically coupled to the input terminal or the first low-voltage terminal, so that in the reset phase, under control of a reset signal provided by the reset terminal, the first pull-up node is reset by the input signal or the first low voltage.

Optionally, the gate driving unit according to the embodiment of the present application further includes a third pull-up node reset circuit.

The third pull-up node reset circuit is electrically coupled to an inter-frame reset terminal, the first pull-up node and the first low-voltage terminal, respectively. The third pull-up node reset circuit is configured to, under control of an inter-frame reset signal provided by the inter-frame reset terminal, control coupling or discoupling between the first pull-up node and the first low-voltage terminal during an inter-frame blank period.

In a specific implementation, the gate driving unit according to the embodiment of the present application may further include a third pull-up node reset circuit. The third pull-up node reset circuit is configured to, in the inter-frame blank period, under control of an inter-frame reset signal, control coupling between the first pull-up node and the first low-voltage terminal, thereby resetting the potential of the first pull-up node.

Optionally, the gate driving unit according to the embodiment of the present application further includes a carry-signal output circuit and a gate driving signal output circuit.

The carry-signal output circuit is electrically coupled to the second pull-up node, a second clock signal terminal, the pull-down node, a carry-signal output terminal and the first low-voltage terminal, respectively. The carry-signal output circuit is configured to, under control of the potential of the second pull-up node, control the carry-signal output terminal to be electrically coupled to the second clock signal terminal; and, under control of the potential of the pull-down node, control coupling or discoupling between the carry-signal output terminal and the first low-voltage terminal.

The gate driving signal output circuit is electrically coupled to the second pull-up node, the second clock signal terminal, the pull-down node, the gate driving signal output terminal, and a second low-voltage terminal, respectively. The gate driving signal output circuit is configured to, under control of the potential of the second pull-up node, control the gate driving signal output terminal to be electrically coupled to the second clock signal terminal; and, under control of the potential of the pull-down node, control coupling or discoupling between the gate driving signal output terminal and the second low-voltage terminal.

In the embodiment of the present application, the gate driving unit may further include a carry-signal output circuit and a gate driving signal output circuit. The carry-signal output circuit is configured to control the carry-signal output terminal to output a carry signal. The gate driving signal output circuit is configured to control the gate driving signal output terminal to output a gate driving signal. The carry-signal output terminal is configured to provide an input signal for an adjacent lower-level shift register unit, and to provide a reset signal for an adjacent upper-level shift register unit. The gate driving signal output terminal is configured to provide a gate driving signal for gate drive.

In the embodiment of the present application, a first low-voltage provided by the first low-voltage terminal is less than a second low-voltage provided by the second low-voltage terminal, and is used to compensate, in a non-output phase, a stress of a first gate driving output transistor for outputting a gate driving signal included in the gate driving signal output circuit, thereby reducing a threshold voltage drift of the first gate driving signal output transistor.

Figure 4:
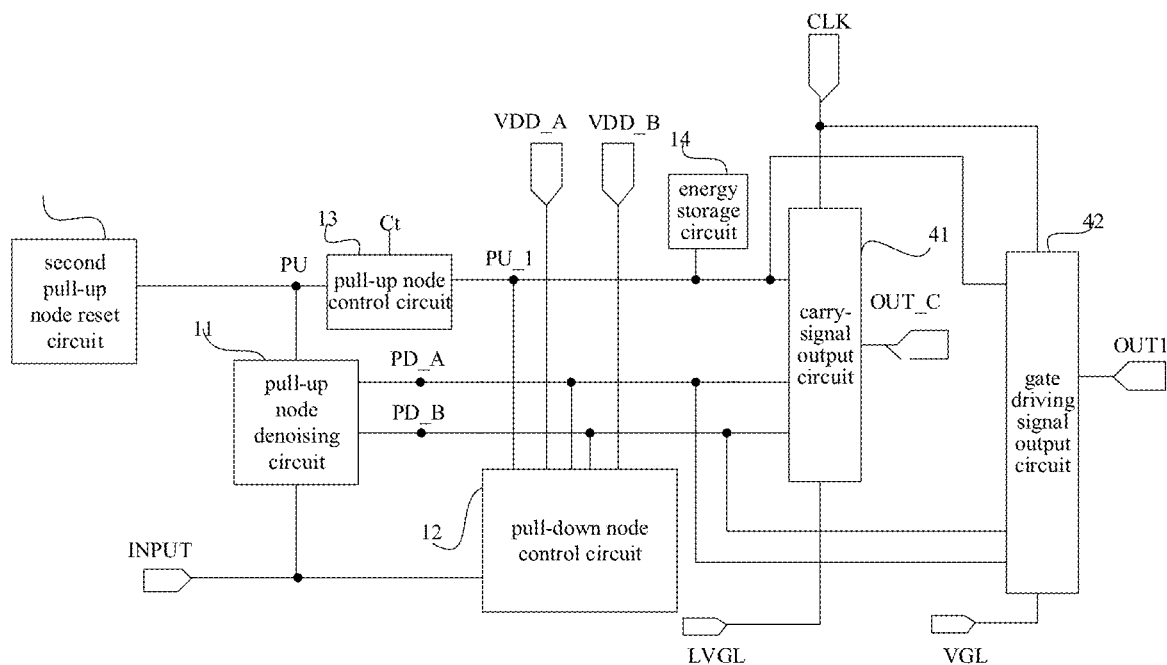
FIG. 4 is a schematic structural diagram of a gate driving unit according to still another embodiment of the present application.

As shown in FIG. 4, based on the embodiment of the gate driving unit shown in FIG. 3, the gate driving unit according to the embodiment of the present application may further include a second pull-up node reset circuit 40, a carry-signal output circuit 41 and a gate driving signal output circuit 42.

The second pull-up node reset circuit 40 is electrically coupled to the first pull-up node PU. The second pull-up node reset circuit 40 is configured to, in the reset phase, reset the potential of the first pull-up node PU.

The carry-signal output circuit 41 is electrically coupled to the second pull-up node PU_1, the second clock signal terminal, the first pull-down node PD_A, the carry-signal output terminal OUT_C and the first low-voltage terminal, respectively. The carry-signal output circuit 41 is configured to, under control of the potential of the second pull-up node PU_1, control the carry-signal output terminal OUT_C to be electrically coupled to the second clock signal terminal; and, under control of the potential of the first pull-down node PD_A and the potential of the second pull-down node PD_B, control coupling or decoupling between the carry-signal output terminal OUT_C and the first low-voltage terminal. The second clock signal terminal is configured to provide a second clock signal CLK. The first low-voltage terminal is configured to provide a first low-voltage LVGL.

The gate driving signal output circuit 42 is electrically coupled to the second pull-up node PU_1, the second clock signal terminal, the first pull-down node PD_A, the second pull-down node PD_B, the gate driving signal output terminal OUT1, and the second low-voltage terminal, respectively. The gate driving signal output circuit 42 is configured to, under control of the potential of the second pull-up node PU_1, control the gate driving signal output terminal OUT1 to be electrically coupled to the second clock signal terminal; and, under control of the potential of the first pull-down node PD_A and the potential of the second pull-down node PD_B, control coupling or decoupling between the gate driving signal output terminal OUT1 and the second low-voltage terminal.

The second low-voltage terminal is used to provide a second low-voltage VGL.

Optionally, the pull-down node may include a first pull-down node and a second pull-down node.

The carry-signal output circuit includes a first carry-signal output transistor, a second carry-signal output transistor, and a third carry-signal output transistor. The gate driving signal output circuit includes a first gate driving output transistor, a second gate driving output transistor and a third gate driving output transistor.

A control electrode of the first carry-signal output transistor is electrically coupled to the second pull-up node. A first electrode of the first carry-signal output transistor is electrically coupled to the second clock signal terminal. A second electrode of the first carry-signal output transistor is electrically coupled to the carry-signal output terminal.

A control electrode of the second carry-signal output transistor is electrically coupled to the first pull-down node. A first electrode of the second carry-signal output transistor is electrically coupled to the carry-signal output terminal. A second electrode of the second carry-signal output transistor is electrically coupled to the first low-voltage terminal.

A control electrode of the third carry-signal output transistor is electrically coupled to the second pull-down node. A first electrode of the third carry-signal output transistor is electrically coupled to the carry-signal output terminal. A second electrode of the third carry-signal output transistor is electrically coupled to the first low-voltage terminal.

A control electrode of the first gate driving output transistor is electrically coupled to the second pull-up node. A first electrode of the first gate driving output transistor is electrically coupled to the second clock signal terminal. A second electrode of the first gate driving output transistor is electrically coupled to the gate driving signal output terminal.

A control electrode of the second gate driving output transistor is electrically coupled to the first pull-down node. A first electrode of the second gate driving output transistor is electrically coupled to the gate driving signal output terminal. A second electrode of the second gate driving output transistor is electrically coupled to the second low-voltage terminal.

A control electrode of the third gate driving output transistor is electrically coupled to the second pull-down node. A first electrode of the third gate driving output transistor is electrically coupled to the gate driving signal output terminal. A second electrode of the third gate driving output transistor is electrically coupled to the first low-voltage terminal.

Figure 5:
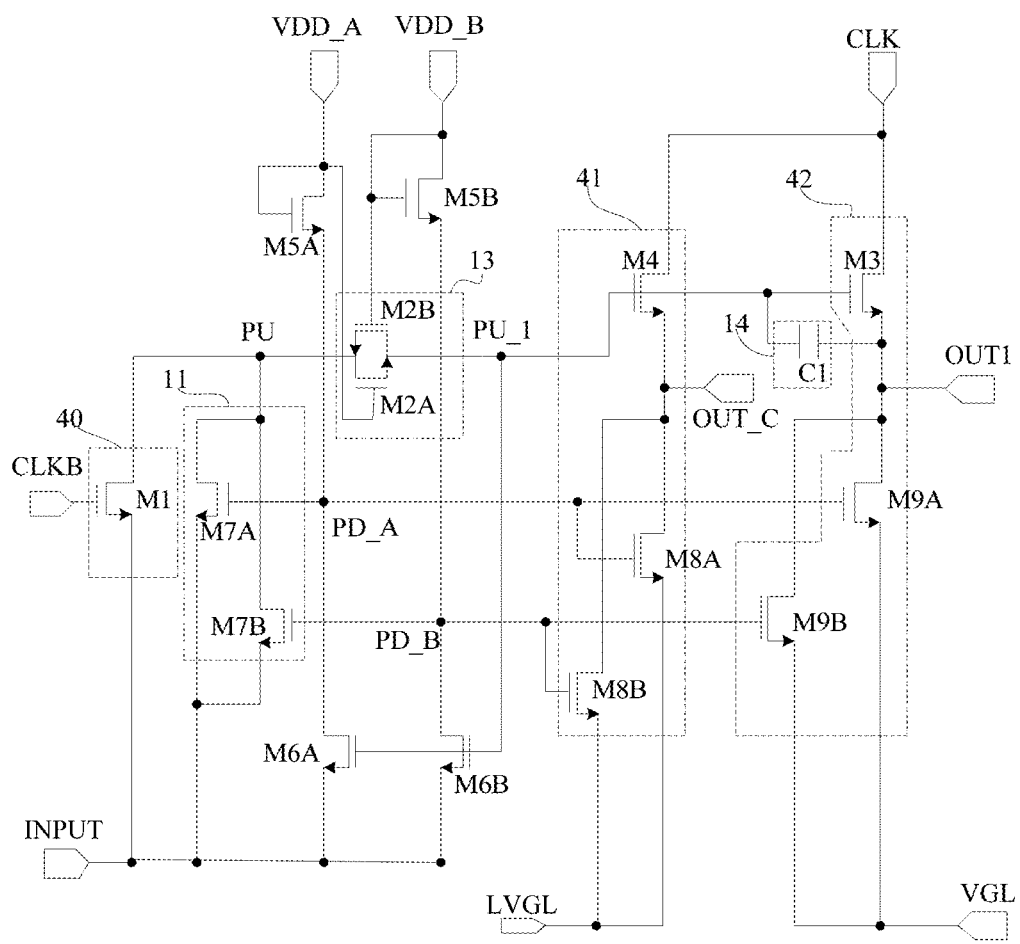
FIG. 5 is a circuit diagram of a gate driving unit according to an embodiment of the present application.

As shown in FIG. 5, based on the embodiment of the gate driving unit shown in FIG. 4, the pull-up node denoising circuit 11 includes a first pull-up node denoising transistor M7A and a second pull-up node denoising transistor M7B.

A gate electrode of the first pull-up node denoising transistor M7A is electrically coupled to the first pull-down node PD_A. A drain electrode of the first pull-up node denoising transistor M7A is electrically coupled to the pull-up node PU. A source electrode of the first pull-up node denoising transistor M7A is electrically coupled to the input terminal INPUT.

A gate electrode of the second pull-up node denoising transistor M7B is electrically coupled to the second pull-down node PD_B. A drain electrode of the second pull-up node denoising transistor M7B is electrically coupled to the pull-up node PU. A source electrode of the second pull-up node denoising transistor M7B is electrically coupled to the input terminal INPUT.

The pull-down node control circuit 12 includes a first pull-down control transistor M5A, a second pull-down control transistor M6A, a third pull-down control transistor M5B, and a fourth pull-down control transistor M6B.

A gate electrode of the first pull-down control transistor M5A and a drain electrode of the first pull-down control transistor M5A are both electrically coupled to the first control voltage terminal VDD_A. A source electrode of the first pull-down control transistor M5A is electrically coupled to the first pull-down node PD_A.

A gate electrode of the second pull-down control transistor M6A is electrically coupled to the second pull-up node PU_1. A drain electrode of the second pull-down control transistor M6A is electrically coupled to the first pull-down node PD_A. A source electrode of the pull-down control transistor M6A is electrically coupled to the input terminal INPUT.

A gate electrode of the third pull-down control transistor M5B and a drain electrode of the third pull-down control transistor M5B are both electrically coupled to the second control voltage terminal VDD_B. A source electrode of the third pull-down control transistor M5B is electrically coupled to the second pull-down node PD_B.

A gate electrode of the fourth pull-down control transistor M6B is electrically coupled to the second pull-up node PU_1. A drain electrode of the fourth pull-down control transistor M6B is electrically coupled to the second pull-down node PD_B. A source electrode of the fourth pull-down control transistor M6B is electrically coupled to the input terminal INPUT.

The pull-up node control circuit 13 includes a first pull-up control transistor M2A and a second pull-up control transistor M2B. The energy storage circuit 14 includes a storage capacitor C1.

A gate electrode of the first pull-up control transistor M2A is electrically coupled to the first control voltage terminal VDD_A. A source electrode of the first pull-up control transistor M2A is electrically coupled to the first pull-up node PU. A drain electrode of the first pull-up control transistor M2A is electrically coupled to the second pull-up node PU_1.

A gate electrode of the second pull-up control transistor M2B is electrically coupled to the second control voltage terminal VDD_B. A source electrode of the second pull-up control transistor M2B is electrically coupled to the first pull-up node PU. A drain electrode of the second pull-up control transistor M2B is electrically coupled to the second pull-up node PU_1.

A first terminal of the storage capacitor C1 is electrically coupled to the second pull-up node PU_1. A second terminal of the storage capacitor C1 is electrically coupled to the gate driving signal output terminal OUT1.

The second pull-up node reset circuit 40 includes a second pull-up node reset transistor M1.

A gate electrode of the second pull-up node reset transistor M1 is electrically coupled to the first clock signal terminal. A drain electrode of the second pull-up node reset transistor M1 is electrically coupled to the first pull-up node PU. A source electrode of the second pull-up node reset transistor M1 is electrically coupled to the input terminal INPUT. The first clock signal terminal is used to provide a first clock signal CLKB.

The carry-signal output circuit 41 includes a first carry-signal output transistor M4, a second carry-signal output transistor M8A, and a third carry-signal output transistor M8B. The gate driving signal output circuit 42 includes a first gate driving output transistor M3, a second gate driving output transistor M9A and a third gate driving output transistor M9B.

A gate electrode of the first carry-signal output transistor M4 is electrically coupled to the second pull-up node PU_1. A drain electrode of the first carry-signal output transistor M4 is electrically coupled to the second clock signal terminal. A source electrode of the first carry-signal output transistor M4 is electrically coupled to the carry-signal output terminal OUT_C. The second clock signal terminal is used to provide a second clock signal CLK.

A gate electrode of the second carry-signal output transistor M8A is electrically coupled to the first pull-down node PD_A. A drain electrode of the second carry-signal output transistor M8A is electrically coupled to the carry-signal output terminal OUT_C. A source electrode of the second carry-signal output transistor M8A is electrically coupled to the first low-voltage terminal. The first low-voltage terminal is used to provide a first low-voltage LVGL.

A gate electrode of the third carry-signal output transistor M8B is electrically coupled to the second pull-down node PD_B. A drain electrode of the third carry-signal output transistor M8B is electrically coupled to the carry-signal output terminal OUT_C. A source electrode of the third carry-signal output transistor M8B is electrically coupled to the first low-voltage terminal.

A gate electrode of the first gate driving output transistor M3 is electrically coupled to the second pull-up node PU_1. A drain electrode of the first gate driving output transistor M3 is electrically coupled to the second clock signal terminal. A source electrode of the first gate driving output transistor M3 is electrically coupled to the gate driving signal output terminal OUT1.

A gate electrode of the second gate driving output transistor M9A is electrically coupled to the first pull-down node PD_A. A drain electrode of the second gate driving output transistor M9A is electrically coupled to the gate driving signal output terminal OUT1. A source electrode of the second gate driving output transistor M9A is electrically coupled to the second low-voltage terminal. The second low-voltage terminal is used to provide a second low-voltage VGL.

A gate electrode of the third gate driving output transistor M9B is electrically coupled to the second pull-down node PD_B. A drain electrode of the third gate driving output transistor M9B is electrically coupled to the gate driving signal output terminal OUT1. A source electrode of the third gate driving output transistor M9B is electrically coupled to the second low-voltage terminal.

In the embodiment shown in FIG. 5, all transistors are N-type metal-oxide-semiconductor transistors (NMOS) transistors, but not limited to this.

In the embodiment shown in FIG. 5, the first low-voltage LVGL is less than the second low-voltage VGL to compensate, in a non-output phase, a stress of a first gate driving output transistor M3 for outputting a gate driving signal included in the gate driving signal output circuit 42, thereby reducing a threshold voltage drift of the first gate driving signal output transistor M3.

Figure 6:
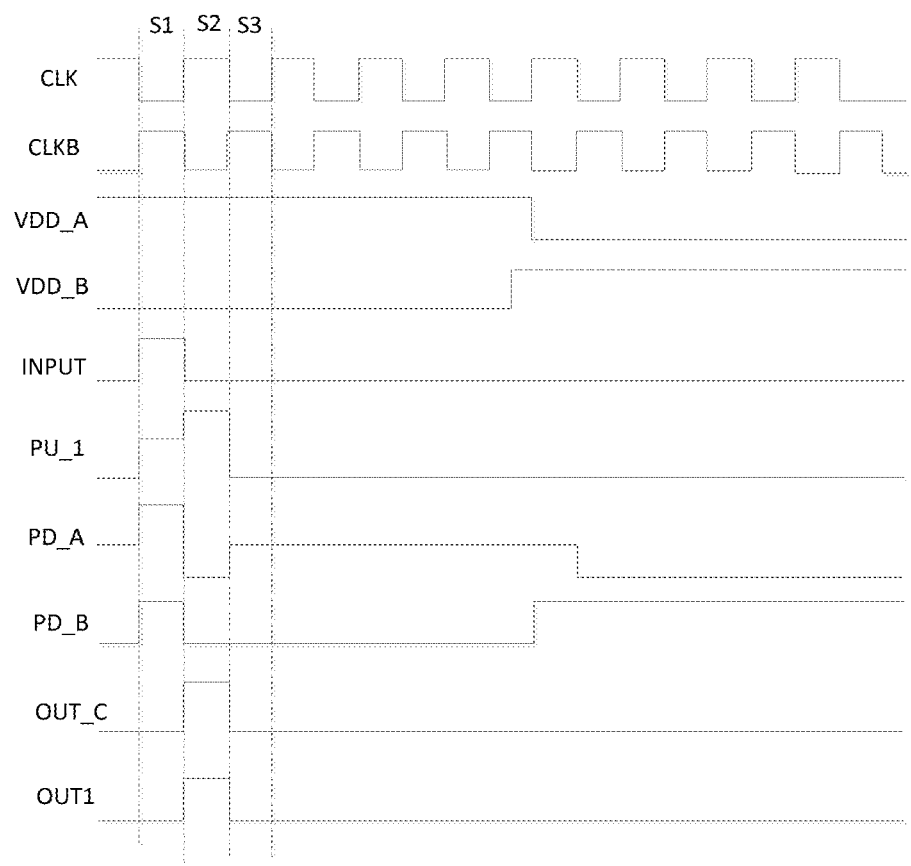
FIG. 6 is an operation timing diagram of a gate driving unit shown in FIG. 5 according to an embodiment of the present application.

As shown in FIG. 6, when the gate driving unit shown in FIG. 5 according to the embodiment of the present application is in operation, In an input phase S1, a second clock signal CLK is a low voltage, a first clock signal CLKB is a high voltage, the first control voltage terminal VDD_A provides a high voltage, the second control voltage terminal VDD_B provides a low voltage, and the input terminal INPUT provides a high voltage. The second pull-up node reset transistor M1 is turned on and the potential of the first pull-up node PU is a high voltage; the first pull-down control transistor M5A is turned on and the first pull-up control transistor M2A is turned on at a beginning of the input phase S1, so that the first pull-up node PU is coupled to the second pull-up node PU_1, thereby charging the storage capacitor C1 to increase the potential of the second pull-up node PU_1. When the potential of the second pull-up node PU_1 reaches a predetermined potential, the first pull-up control transistor M2A is turned off. The first pull-up node denoising transistor M7A, the second pull-up node denoising transistor M7B, the second pull-down control transistor M6A and the fourth pull-down control transistor M6B are all turned on, and the potential of the first control voltage terminal PD_A and the potential of the second control voltage terminal PD_B are both high voltages, and both the gate driving signal output terminal OUT1 and the carry-signal output terminal OUT_C output low voltages. The function of the first pull-down node PD_A and the second pull-down node PD_B in the input phase S1 is not to pull down the potential of the first pull-up node PU, but to charge the first pull-up node PU in combination with the input terminal INPUT, thereby eliminating the risk of competition between the pull-up node and pull-down node in the related art.

In an output phase S2, the second clock signal CLK is a high voltage, the first clock signal CLKB is a low voltage, the first control voltage terminal VDD_A provides a high voltage, the second control voltage terminal VDD_B provides a low voltage, and the input terminal INPUT provides a low voltage. The second pull-up node reset transistor M1 is turned off, the first carry-signal output transistor M4 and the first gate driving output transistor M3 are turned on, and both the gate driving signal output terminal OUT1 and the carry-signal output terminal OUT_C output high voltages. The potential of the second pull-up node PU_1 is bootstrapped by the storage capacitor C1, and the second pull-down control transistor M6A and the fourth pull-down control transistor M6B are turned on, so that the potential of the first control voltage terminal PD_A and the potential of the second control voltage terminal PD_B are pulled down.

In the output phase S2, the potential of the gate electrode of the first pull-up control transistor M2A is the high voltage provided by the first control voltage terminal VDD_A; the potential of the source electrode of the first pull-up control transistor M2A is the potential of the first pull-up node PU; and the potential of the drain electrode of the first pull-up control transistor M2A is the potential of the second pull-up node PU_1 (the potential of the second pull-up node PU_1 is higher than the potential of the first pull-up node PU). Then, the first pull-up control transistor M2A is turned off, which can further maintain the potential of the second pull-up node PU_1, and enable the second pull-down control transistor M6A and the fourth pull-down control transistor M6B to be fully turned on, so that the potential of the first control voltage terminal PD_A and the potential of the second control voltage terminal PD_B are low voltages, thereby turning off the first pull-up node denoising transistor M7A, the second pull-up node denoising transistor M7B, the second carry-signal output transistor M8A, the third carry-signal output transistor M8B, the second gate driving output transistor M9A and the third gate driving output transistor M9B.

In a reset phase S3, the second clock signal CLK is a low voltage, the first clock signal CLKB is a high voltage, the first control voltage terminal VDD_A provides a high voltage, the second control voltage terminal VDD_B provides a low voltage, and the input terminal INPUT provides a low voltage. The second pull-up node reset transistor M1 is turned on, so that the potential of the first pull-up node PU becomes a low voltage, and the first pull-up control transistor M2A is turned on so that the potential of the second pull-up node PU_1 becomes a low voltage. The first pull-down control transistor M5A is turned on, the second pull-down control transistor M6A and the fourth pull-down control transistor M6B are turned off, the third pull-down control transistor M5B is turned off, the potential of the first control voltage terminal PD_A is a high voltage, and the potential of the second control voltage terminal PD_B is a low voltage. The second carry-signal output transistor M8A and the second gate driving output transistor M9A are turned on, the third carry-signal output transistor M8B and the third gate driving output transistor M9B are turned off, and the first gate driving output transistor M3 and the first carry-signal output transistor M4 are turned off, the carry-signal output terminal OUT_C outputs the first low-voltage LVGL, and the gate driving signal output terminal OUT1 outputs the second low-voltage VGL.

Before a next frame signal comes, or after a few more frames of screen display time, the first control voltage provided by the first control voltage terminal VDD_A and the second control voltage provided by the second control voltage terminal VDD_B undergo high-low voltage conversion to maintain normal denoising function while preventing failure of the gate driving unit caused by the threshold voltage shift of the denoising transistor controlled by the first control voltage terminal PD_A and the denoising transistor controlled by the second control voltage terminal PDB due to long-term positive stress.

Figure 7:
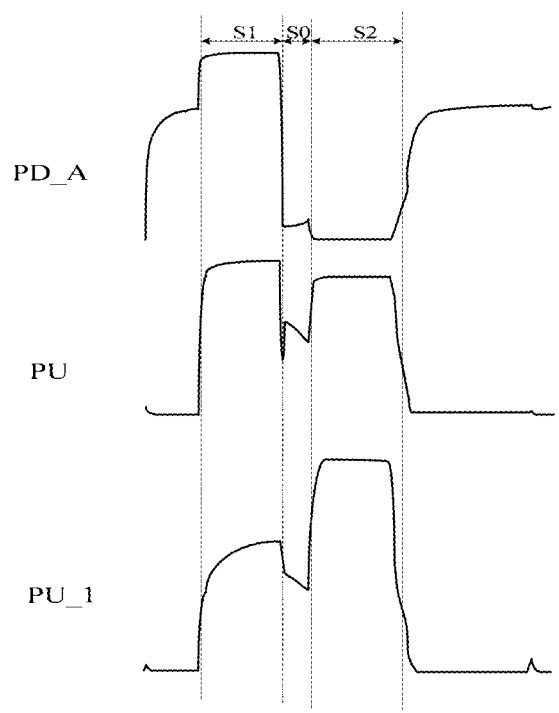
FIG. 7 is a simulation timing diagram of a gate driving unit shown in FIG. 5 according to an embodiment of the present application.

When the gate driving unit shown in FIG. 5 according to the embodiment of the present application is in operation, in a case that a duty ratio of the second clock signal CLK and a duty ratio of the first clock signal CLKB are not 0.5, as shown in FIG. 7, in a time period S0 between the input phase S1 and the output phase S2, due to existence of the first pull-up control transistor M2A and the second pull-up control transistor M2B, the potential of the second pull-up node PU_1 will not be pulled too low.

When the gate driving unit according to the embodiment of the present application is in operation, in a case that a duty cycle of a clock signal used by the gate driving unit is less than 0.5, there is a time period between the input phase and the output phase, and there is a time period between the output phase and the reset phase. In the time period between the input phase and the output phase as well as in the time period between the output phase and the reset phase, the gate driving signal output terminal OUT1 outputs the first low-voltage LVGL (i.e., the potential of the second clock signal CLK is the first low-voltage LVGL in the time period between the input phase and the output phase as well as in the second time period between the output phase and the reset phase).

Figure 8:
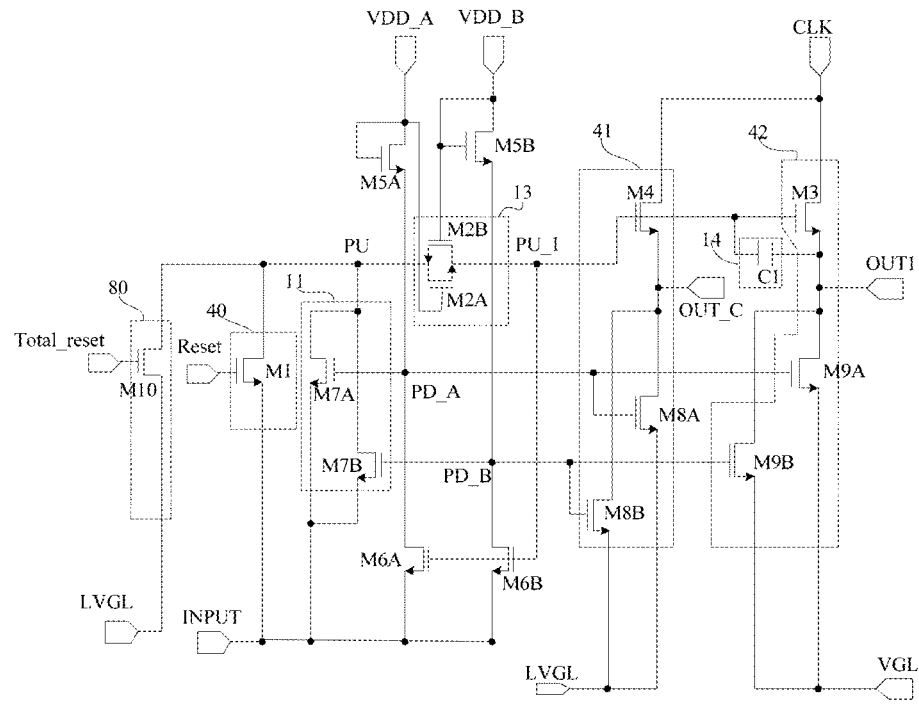
FIG. 8 is a circuit diagram of a gate driving unit according to another embodiment of the present application.

The difference between the embodiment of the gate driving unit shown in FIG. 8 and the embodiment of the gate driving unit shown in FIG. 5 is that: the gate electrode of the second pull-up node reset transistor M1 is electrically coupled to the reset terminal Reset, and the drain electrode of the pull-up node reset transistor M1 is electrically coupled to the first pull-up node PU, and the source electrode of the second pull-up node reset transistor M1 is electrically coupled to the input terminal INPUT.

The embodiment of the gate driving unit shown in FIG. 8 of the present application further includes a third pull-up node reset circuit 80.

The third pull-up node reset circuit 80 includes a third pull-up node reset transistor M10.

A gate electrode of the third pull-up node reset transistor M10 is electrically coupled to an inter-frame reset terminal Total reset. A drain electrode of the third pull-up node reset transistor M10 is electrically coupled to the first pull-up node PU. A source electrode of the third pull-up node reset transistor M10 is electrically coupled to the first low-voltage terminal.

In the embodiment shown in FIG. 8, the third pull-up node reset transistor M10 may be, but not limited to, an NMOS transistor.

When the embodiment of the gate driving unit shown in FIG. 8 of the present application is in operation, in the reset phase, the reset terminal Reset provides a high voltage, and the second pull-up node reset transistor M1 is turned on. In an inter-frame blank period (i.e., a blank period between display time periods of two frames), the inter-frame reset terminal Total reset provides a high voltage, and the third pull-up node reset transistor M10 is turned on to reset the potential of the first pull-up node PU.

Figure 9:
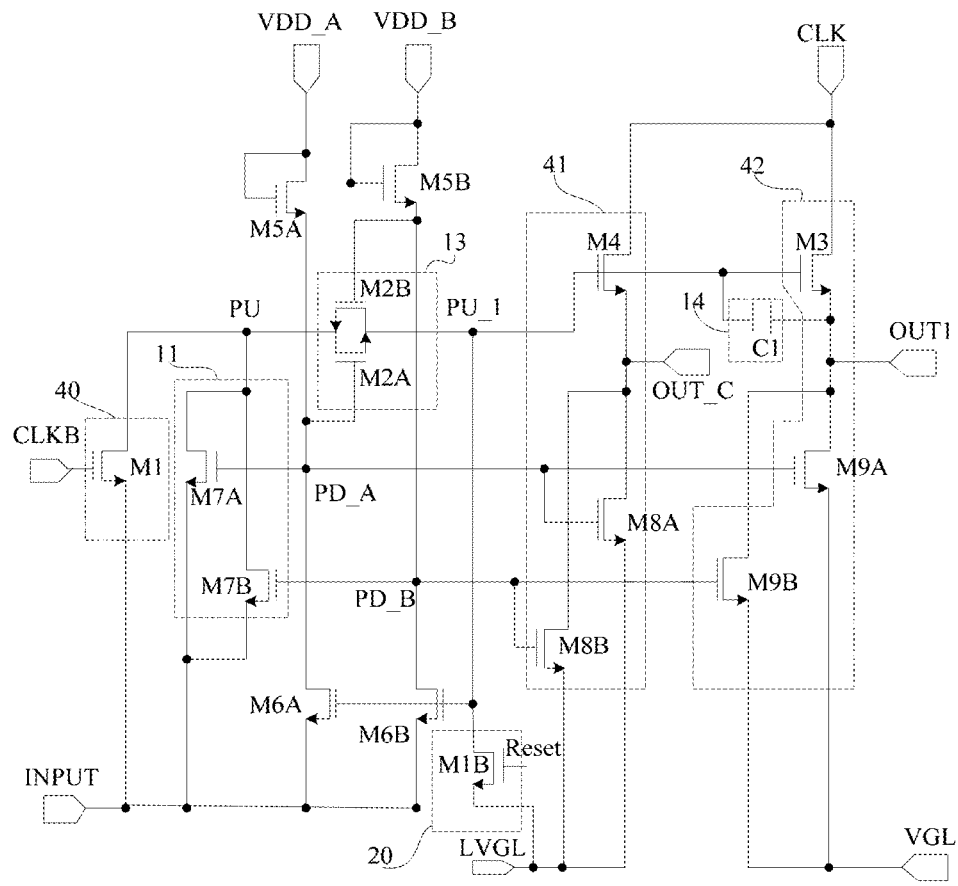
FIG. 9 is a circuit diagram of a gate driving unit according to yet another embodiment of the present application.

The difference between the embodiment of the gate driving unit shown in FIG. 9 and the embodiment of the gate driving unit shown in FIG. 5 is that: the gate electrode of the first pull-up control transistor M2A is electrically coupled to the first pull-down node PD_A, and the gate electrode of the second pull-up control transistor M2B is electrically coupled to the second pull-down node PD_B.

Moreover, the embodiment of the gate driving unit shown in FIG. 9 of the present application further includes a first pull-up node reset circuit 20.

The first pull-up node reset circuit 20 includes a first pull-up node reset transistor M1B.

A gate electrode of the first pull-up node reset transistor M1B is electrically coupled to the reset terminal Reset. A drain electrode of the first pull-up node reset transistor M1B is electrically coupled to the second pull-up node PU_1. A source electrode of the first pull-up node reset transistor M1B is electrically coupled to the first low-voltage LVGL.

In the embodiment shown in FIG. 9, the first pull-up node reset transistor M1B is an NMOS transistor, but it is not limited to this.

Figure 10:
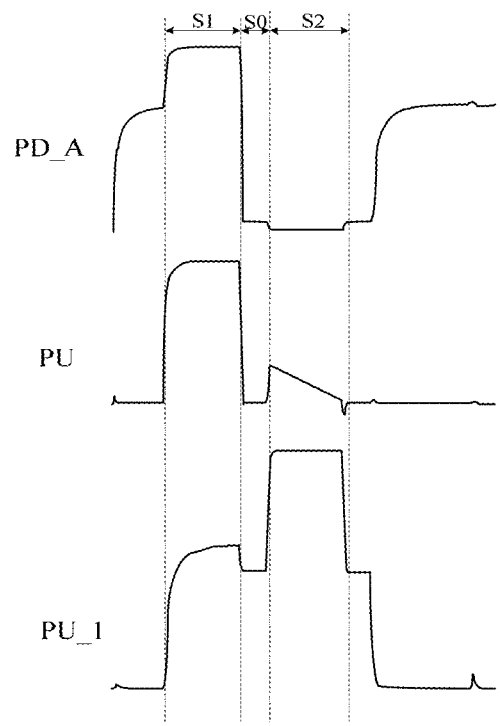
FIG. 10 is a simulation timing diagram of a gate driving unit shown in FIG. 9 according to an embodiment of the present application.

When the embodiment of the gate driving unit shown in FIG. 9 of the present application is in operation, in a case that the duty ratio of the second clock signal CLK and the duty ratio of the first clock signal CLKB are not 0.5, as shown in FIG. 10, in a time period S0 between the input phase S1 and the output phase S2, since the potential of the first control voltage terminal PD_A and the potential of the second control voltage terminal PD_B are low voltages (the potential of the first control voltage terminal PD_A is shown in FIG. 10), the gate-source voltage of the first pull-up control transistor M2A and the gate-source voltage of the second pull-up control transistor M2B are relatively small, so the leakage current of the first pull-up control transistor M2A and the leakage current of the second pull-up control transistor M2B are small. Then, in the time period S0 between the input phase S1 and the output phase S2, the potential of the second pull-up node PU_1 is maintained well. In the input phase, since the potential of the first pull-down node PD_A is higher than a voltage value of a control voltage provided by the first control voltage terminal VDD_A, the charging effect on the second pull-up node PU_1 is better, and the potential of the second pull-up node PU_1 can be charged to a higher value.

Figure 11:
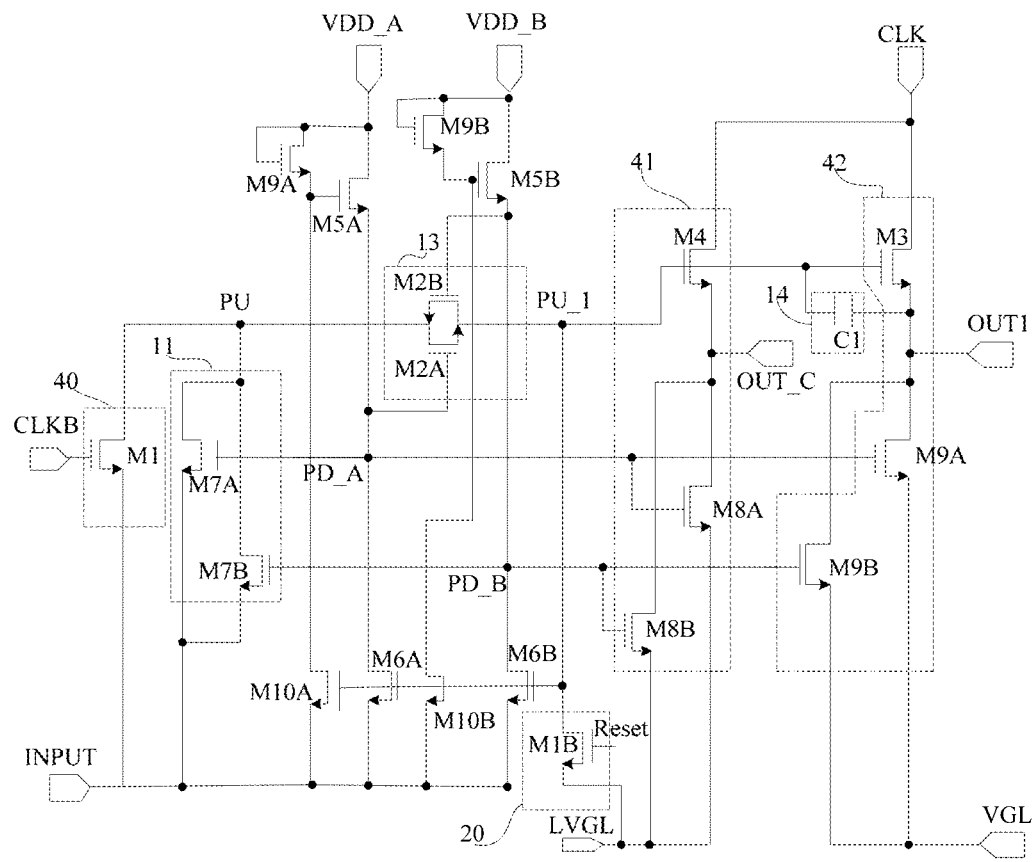
FIG. 11 is a circuit diagram of a gate driving unit according to still yet another embodiment of the present application.

The difference between the embodiment of the gate driving unit shown in FIG. 11 and the embodiment of the gate driving unit shown in FIG. 9 is that: the pull-down node control circuit includes a first pull-down control transistor M5A, a second pull-down control transistor M6A, a third pull-down control transistor M5B, a fourth pull-down control transistor M6B, a fifth pull-down control transistor M9A, a sixth pull-down control transistor M10A, a seventh pull-down control transistor M9B, and an eighth pull-down control transistor M10B.

A gate electrode of the fifth pull-down control transistor M9A and a drain electrode of the fifth pull-down control transistor M9A are both electrically coupled to the first control voltage terminal VDD_A.

A gate electrode of the first pull-down control transistor M5A is electrically coupled to a source electrode of the fifth pull-down control transistor M9A. A drain electrode of the first pull-down control transistor M5A is electrically coupled to the first control voltage terminal VDD_A. A source electrode of the first pull-down control transistor M5A is electrically coupled to the first pull-down node PD_A.

A gate electrode of the sixth pull-down control transistor M10A is electrically coupled to the second pull-up node PU_1. A drain electrode of the sixth pull-down control transistor M10A is electrically coupled to the source electrode of the fifth pull-down control transistor M9A. A source electrode of the sixth pull-down control transistor M10A is electrically coupled to the input terminal INPUT.

A gate electrode of the second pull-down control transistor M6A is electrically coupled to the second pull-up node PU_1. A drain electrode of the second pull-down control transistor M6A is electrically coupled to the first pull-down node PD_A. A source electrode of the second pull-down control transistor M6A is electrically coupled to the input terminal INPUT.

A gate electrode of the seventh pull-down control transistor M9B and a drain electrode of the seventh pull-down control transistor M9B are both electrically coupled to the second control voltage terminal VDD_B.

A gate electrode of the third pull-down control transistor M5B is electrically coupled to a source electrode of the seventh pull-down control transistor M9B. A drain electrode of the third pull-down control transistor M5B is electrically coupled to the second control voltage terminal VDD_B. A source electrode of the third pull-down control transistor M5B is electrically coupled to the second pull-down node PD_B.

A gate electrode of the eighth pull-down control transistor M10B is electrically coupled to the second pull-up node PU_1. A drain electrode of the eighth pull-down control transistor M10B is electrically coupled to the source electrode of the seventh pull-down control transistor M9B. A source electrode of the eighth pull-down control transistor M10B is electrically coupled to the input terminal INPUT.

A gate electrode of the fourth pull-down control transistor M6B is electrically coupled to the second pull-up node PU_1. A drain electrode of the fourth pull-down control transistor M6B is electrically coupled to the second pull-down node PD_B. A source electrode of the fourth pull-down control transistor M6B is electrically coupled to the input terminal INPUT.

In the embodiment of the gate driving unit shown in FIG. 11, the first pull-down control transistor M5A, the second pull-down control transistor M6A, the third pull-down control transistor M5B, the fourth pull-down control transistor M6B, the fifth pull-down control transistor M9A, the sixth pull-down control transistor M10A, the seventh pull-down control transistor M9B and the eighth pull-down control transistor M10B are all NMOS transistors, but not limited to this.

Figure 12:
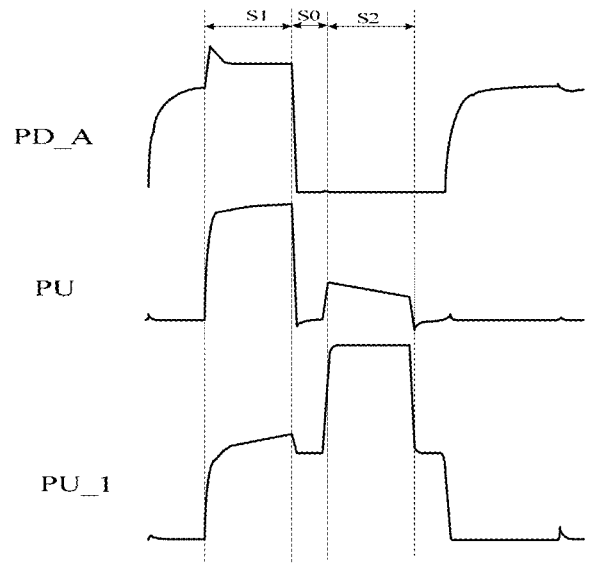
FIG. 12 is a simulation timing diagram of a gate driving unit shown in FIG. 11 according to an embodiment of the present application.

When the embodiment of the gate driving unit shown in FIG. 11 of the present application is in operation, in a case that the duty ratio of the second clock signal CLK and the duty ratio of the first clock signal CLKB are not 0.5, as shown in FIG. 12, compared with FIG. 10, in the output phase S2, the potential of the first control voltage terminal PD_A can be reduced to a sufficiently low level under control of the second pull-up node PU_1 so as not to affect the potential of the second pull-up node PU_1.

Figure 13:
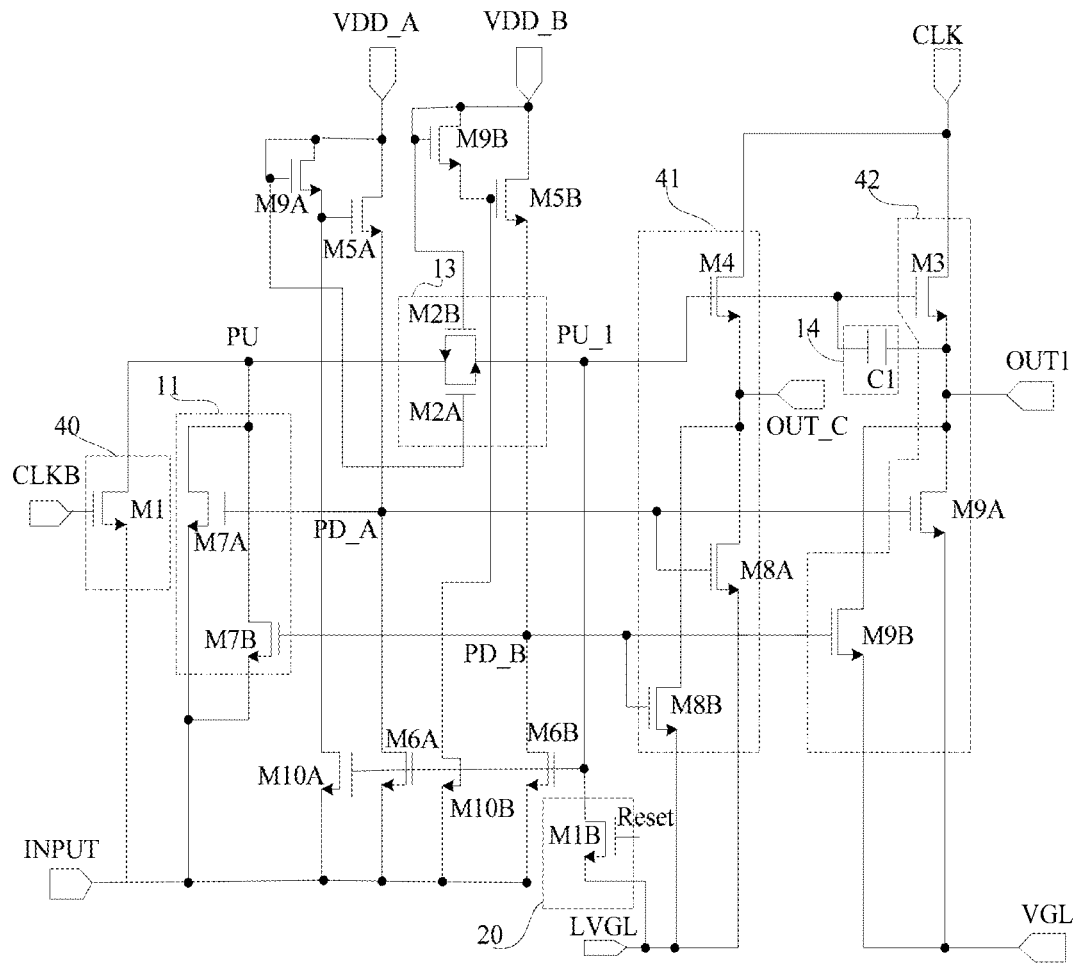
FIG. 13 is a circuit diagram of a gate driving unit according to still yet another embodiment of the present application.

The difference between the embodiment of the gate driving unit shown in FIG. 13 and the embodiment of the gate driving unit shown in FIG. 11 is that: the gate electrode of the first pull-up control transistor M2A is electrically coupled to the first control voltage terminal VDD_A, and the gate electrode of the second pull-up control transistor M2B is electrically coupled to the second control voltage terminal VDD_B.

Figure 14:
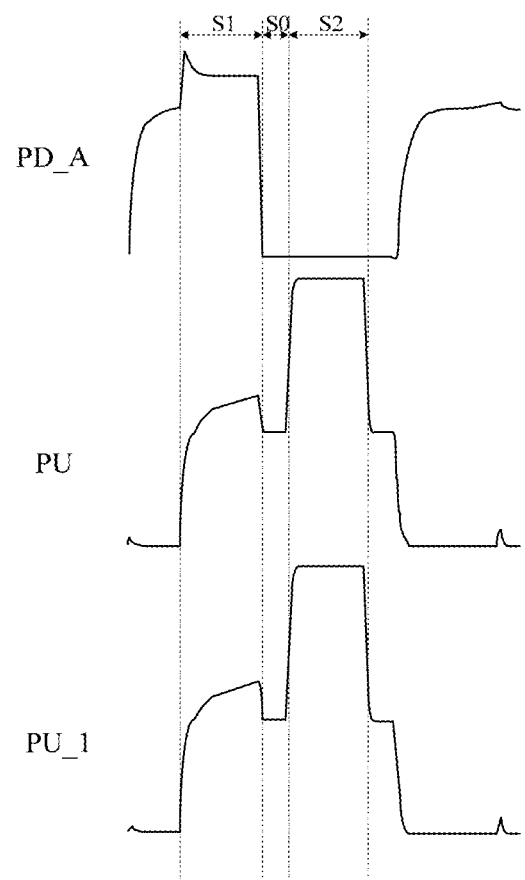
FIG. 14 is a simulation timing diagram of a gate driving unit shown in FIG. 13 according to an embodiment of the present application.

When the embodiment of the gate driving unit shown in FIG. 13 of the present application is in operation, in a case that the duty ratio of the second clock signal CLK and the duty ratio of the first clock signal CLKB are not 0.5, as shown in FIG. 14, in the time period S0 between the input phase S1 and the output phase S2, the potential of the second pull-up node PU_1 will not be reduced too low.

Comparing FIG. 14 and FIG. 12, when the embodiment of the gate driving unit shown in FIG. 13 is adopted, in the time period S0, the potential of the second pull-up node PU_1 is higher; and in the output phase S2, the potential of the second pull-up node PU_1 is much higher.

A gate driving circuit according to an embodiment of the present application includes multiple stages of the foregoing gate driving units.

In the embodiment of the present application, the gate driving unit includes an input terminal and a carry-signal output terminal.

The input terminal of the gate driving unit is electrically coupled to the carry-signal output terminal of an adjacent upper-level gate driving unit.

A gate driving method according to an embodiment of the present application is applied to the foregoing gate driving unit. The gate driving method includes:

under control of the potential of the pull-down node, controlling, by the pull-up node denoising circuit, coupling or discoupling between the first pull-up node and the input terminal;

under control of the control voltage provided by the control voltage terminal, controlling, by the pull-down node control circuit, coupling or discoupling between the control voltage terminal and the pull-down node; and, under control of the potential of the second pull-up node, controlling, by the pull-down node control circuit, coupling or discoupling between the pull-down node and the input terminal;

under control of the anti-leakage control voltage provided by the anti-leakage control terminal, controlling, by the pull-up node control circuit, coupling or discoupling between the first pull-up node and the second pull-up node, and maintaining the potential of the second pull-up node.

A display device according to an embodiment of the present application includes the foregoing gate driving circuit.

The display device provided in the embodiment of the present application may be any product or component with display function, such as a mobile phone, a tablet computer, a television, a monitor, a notebook computer, a digital photo frame, a navigator.

The above are optional embodiments of the present application. It should be pointed out that, for persons having ordinary skill in the art, several improvements and changes may be made, without departing from the principle of the present application. These improvements and changes should also be within the scope of the present application.

What is claimed is:

1. A gate driving unit, comprising:
a pull-up node denoising circuit;
a pull-down node control circuit;
a pull-up node control circuit; and
an energy storage circuit;
wherein the pull-up node denoising circuit is electrically coupled to an input terminal, a pull-down node and a first pull-up node, respectively; the pull-up node denoising circuit is configured to, under control of a potential of the pull-down node, control coupling or decoupling between the first pull-up node and the input terminal;

wherein the pull-down node control circuit is electrically coupled to a second pull-up node, the pull-down node and the input terminal, respectively; the pull-down node control circuit is configured to, under control of a control voltage provided by a control voltage terminal, control the potential of the pull-down node; and under control of a potential of the second pull-up node, control coupling or decoupling between the pull-down node and the input terminal;

wherein the pull-up node control circuit is electrically coupled to an anti-leakage control terminal, the first pull-up node and the second pull-up node, respectively; the pull-up node control circuit is configured to, under control of an anti-leakage control voltage provided by the anti-leakage control terminal, control coupling or decoupling between the first pull-up node and the second pull-up node, and configured to maintain the potential of the second pull-up node;

wherein the energy storage circuit is electrically coupled to the second pull-up node and is configured to store electric energy, wherein the pull-down node includes a first pull-down node and a second pull-down node; and the pull-up node denoising circuit includes a first pull-up node denoising transistor and a second pull-up node denoising transistor; a control electrode of the first pull-up node denoising transistor is electrically coupled to the first pull-down node; a first electrode of the first pull-up node denoising transistor is electrically coupled to the pull-up node; a second electrode of the first pull-up node denoising transistor is electrically coupled to the input terminal; a control electrode of the second pull-up node denoising transistor is electrically coupled to the second pull-down node; a first electrode of the second pull-up node denoising transistor is electrically coupled to the pull-up node; and a second electrode of the second pull-up node denoising transistor is electrically coupled to the input terminal.

2. The gate driving unit according to claim 1, wherein the pull-up node denoising circuit is electrically coupled to one pull-down node; the pull-up node denoising circuit includes a pull-up node denoising transistor; a control electrode of the pull-up node denoising transistor is electrically coupled to the pull-down node; a first electrode of the pull-up node denoising transistor is electrically coupled to the pull-up node; and a second electrode of the pull-up node denoising transistor is electrically coupled to the input terminal.

3. The gate driving unit according to claim 1, wherein the anti-leakage control terminal is the pull-down node;
the gate driving unit further includes a first pull-up node reset circuit;
the first pull-up node reset circuit is electrically coupled to a reset terminal, the second pull-up node and a reset voltage terminal, respectively; the first pull-up node reset circuit is configured to, under control of a reset signal provided by the reset terminal, control coupling or decoupling between the second pull-up node and the reset voltage terminal.

4. The gate driving unit according to claim 3, wherein the first pull-up node reset circuit includes a first pull-up node reset transistor;
a gate electrode of the first pull-up node reset transistor is electrically coupled to the reset terminal; a drain electrode of the first pull-up node reset transistor is electrically coupled to the second pull-up node; a source electrode of the first pull-up node reset transistor is electrically coupled to the reset voltage terminal.

5. The gate driving unit according to claim 1, wherein the anti-leakage control terminal is the control voltage terminal or the pull-down node;
the pull-up node control circuit includes a pull-up control transistor, and the energy storage circuit includes a storage capacitor;
a gate electrode of the pull-up control transistor is electrically coupled to the control voltage terminal or the pull-down node; a first electrode of the pull-up control transistor is electrically coupled to the second pull-up node; a second electrode of the pull-up control transistor is electrically coupled to the first pull-up node;
a first terminal of the storage capacitor is electrically coupled to the second pull-up node; a second terminal of the storage capacitor is electrically coupled to a gate driving signal output terminal.

6. The gate driving unit according to claim 1, wherein the control voltage terminal includes a first control voltage terminal and a second control voltage terminal;
the pull-down node control circuit is configured to, under control of a first control voltage provided by the first control voltage terminal, control a potential of the first pull-down node; under control of the second pull-up node, control coupling or decoupling between the first pull-down node and the input terminal; under control of a second control voltage provided by the second control voltage terminal, control a potential of the second pull-down node; and under control of the second pull-up node, control the first pull-down node to be electrically coupled to the input terminal.

7. The gate driving unit according to claim 6, wherein the pull-up node control circuit includes a first pull-up control transistor and a second pull-up control transistor; the energy storage circuit includes a storage capacitor;
a control electrode of the first pull-up control transistor is electrically coupled to the first pull-down node; a first electrode of the first pull-up control transistor is electrically coupled to the second pull-up node; a second electrode of the first pull-up control transistor is electrically coupled to the first pull-up node;
a control electrode of the second pull-up control transistor is electrically coupled to the second pull-down node; a first electrode of the second pull-up control transistor is electrically coupled to the second pull-up node; a second electrode of the second pull-up control transistor is electrically coupled to the first pull-up node;
a first terminal of the storage capacitor is electrically coupled to the second pull-up node; and a second terminal of the storage capacitor is electrically coupled to a gate driving signal output terminal.

8. The gate driving unit according to claim 6, wherein the pull-up node control circuit includes a first pull-up control transistor and a second pull-up control transistor; the energy storage circuit includes a storage capacitor;
a control electrode of the first pull-up control transistor is electrically coupled to the first control voltage terminal; a first electrode of the first pull-up control transistor is electrically coupled to the second pull-up node; a second electrode of the first pull-up control transistor is electrically coupled to the first pull-up node;
a control electrode of the second pull-up control transistor is electrically coupled to the second control voltage terminal; a first electrode of the second pull-up control transistor is electrically coupled to the second pull-up node; a second electrode of the second pull-up control transistor is electrically coupled to the first pull-up node;
a first terminal of the storage capacitor is electrically coupled to the second pull-up node; and a second terminal of the storage capacitor is electrically coupled to the gate driving signal output terminal.

9. The gate driving unit according to claim 6, wherein the pull-down node control circuit includes a first pull-down control transistor, a second pull-down control transistor, a third pull-down control transistor, a fourth pull-down control transistor, a fifth pull-down control transistor, a sixth pull-down control transistor, a seventh pull-down control transistor and an eighth pull-down control transistor;
a control electrode of the fifth pull-down control transistor and a first electrode of the fifth pull-down control transistor are both electrically coupled to the first control voltage terminal;
a control electrode of the first pull-down control transistor is electrically coupled to a second electrode of the fifth pull-down control transistor; a first electrode of the first pull-down control transistor is electrically coupled to the first control voltage terminal; a second electrode of the first pull-down control transistor is electrically coupled to the first pull-down node;
a control electrode of the sixth pull-down control transistor is electrically coupled to the second pull-up node; a first electrode of the sixth pull-down control transistor is electrically coupled to the second electrode of the fifth pull-down control transistor; a second electrode of the sixth pull-down control transistor is electrically coupled to the input terminal;
a control electrode of the second pull-down control transistor is electrically coupled to the second pull-up node; a first electrode of the second pull-down control transistor is electrically coupled to the first pull-down node; a second electrode of the second pull-down control transistor is electrically coupled to the input terminal;
a control electrode of the seventh pull-down control transistor and a first electrode of the seventh pull-down control transistor are both electrically coupled to the second control voltage terminal;
a control electrode of the third pull-down control transistor and a first electrode of the third pull-down control transistor are both electrically coupled to a second electrode of the seventh pull-down control transistor; a second electrode of the third pull-down control transistor is electrically coupled to the second pull-down node;
a control electrode of the eighth pull-down control transistor is electrically coupled to the second pull-up node; a first electrode of the eighth pull-down control transistor is electrically coupled to the second electrode of the seventh pull-down control transistor; a second electrode of the eight pull-down control transistor is electrically coupled to the input terminal;
a control electrode of the fourth pull-down control transistor is electrically coupled to the second pull-up node; a first electrode of the fourth pull-down control transistor is electrically coupled to the second pull-down node; a second electrode of the fourth pull-down control transistor is electrically coupled to the input terminal.

10. The gate driving unit according to claim 1, wherein the gate driving unit further includes a second pull-up node reset circuit;

the second pull-up node reset circuit is electrically coupled to the first pull-up node, and is configured to reset the potential of the first pull-up node in a reset phase.

11. The gate driving unit according to claim 10, wherein the second pull-up node reset circuit includes a second pull-up node reset transistor;
- a control electrode of the second pull-up node reset transistor is electrically coupled to a first clock signal terminal; a first electrode of the second pull-up node reset transistor is electrically coupled to the first pull-up node; a second electrode of the second pull-up node reset transistor is electrically coupled to the input terminal; or,
- a control electrode of the second pull-up node reset transistor is electrically coupled to a reset terminal; a first electrode of the second pull-up node reset transistor is electrically coupled to the first pull-up node; a second electrode of the second pull-up node reset transistor is electrically coupled to the input terminal or a first low-voltage terminal.

12. The gate driving unit according to claim 1, wherein the gate driving unit further includes a third pull-up node reset circuit;
the third pull-up node reset circuit is electrically coupled to an inter-frame reset terminal, the first pull-up node and a first low-voltage terminal, respectively; the third pull-up node reset circuit is configured to, under control of an inter-frame reset signal provided by the inter-frame reset terminal, control coupling or decoupling between the first pull-up node and the first low-voltage terminal during an inter-frame blank period.

13. The gate driving unit according to claim 12, wherein the third pull-up node reset circuit includes a third pull-up node reset transistor;
a gate electrode of the third pull-up node reset transistor is electrically coupled to an inter-frame reset terminal; a drain electrode of the third pull-up node reset transistor is electrically coupled to the first pull-up node; a source electrode of the third pull-up node reset transistor is electrically coupled to the first low-voltage terminal.

14. The gate driving unit according to claim 1, wherein the gate driving unit further includes a carry-signal output circuit and a gate driving signal output circuit;
the carry-signal output circuit is electrically coupled to the second pull-up node, a clock signal terminal, the pull-down node, a carry-signal output terminal and a first low-voltage terminal, respectively; the carry-signal output circuit is configured to, under control of the potential of the second pull-up node, control the carry-signal output terminal to be electrically coupled to the clock signal terminal, and, under control of the potential of the pull-down node, control coupling or decoupling between the carry-signal output terminal and the first low-voltage terminal;
the gate driving signal output circuit is electrically coupled to the second pull-up node, the clock signal terminal, the pull-down node, the gate driving signal output terminal, and a second low-voltage terminal, respectively; the gate driving signal output circuit is configured to, under control of the potential of the second pull-up node, control the gate driving signal output terminal to be electrically coupled to the clock signal terminal, and, under control of the potential of the pull-down node, control coupling or decoupling between the gate driving signal output terminal and the second low-voltage terminal;
a first low-voltage provided by the first low-voltage terminal is less than a second low-voltage provided by the second low-voltage terminal.

15. The gate driving unit according to claim 14, wherein the carry-signal output circuit includes a first carry-signal output transistor, a second carry-signal output transistor, and a third carry-signal output transistor; the gate driving signal output circuit includes a first gate driving output transistor, a second gate driving output transistor and a third gate driving output transistor; the pull-down node includes a first pull-down node and a second pull-down node;
a gate electrode of the first carry-signal output transistor is electrically coupled to the second pull-up node; a drain electrode of the first carry-signal output transistor is electrically coupled to the clock signal terminal; a source electrode of the first carry-signal output transistor is electrically coupled to the carry-signal output terminal; the clock signal terminal is configured to provide a clock signal;
a gate electrode of the second carry-signal output transistor is electrically coupled to the first pull-down node; a drain electrode of the second carry-signal output transistor is electrically coupled to the carry-signal output terminal; a source electrode of the second carry-signal output transistor is electrically coupled to the first low-voltage terminal; the first low-voltage terminal is configured to provide a first low-voltage;
a gate electrode of the third carry-signal output transistor is electrically coupled to the second pull-down node; a drain electrode of the third carry-signal output transistor is electrically coupled to the carry-signal output terminal; a drain electrode of the third carry-signal output transistor is electrically coupled to the first low-voltage terminal;
a gate electrode of the first gate driving output transistor is electrically coupled to the second pull-up node; a drain electrode of the first gate driving output transistor is electrically coupled to the clock signal terminal; a source electrode of the first gate driving output transistor is electrically coupled to the gate driving signal output terminal;
a gate electrode of the second gate driving output transistor is electrically coupled to the first pull-down node; a drain electrode of the second gate driving output transistor is electrically coupled to the gate driving signal output terminal; a source electrode of the second gate driving output transistor is electrically coupled to the second low-voltage terminal; the second low-voltage terminal is configured to provide a second low-voltage;
a gate electrode of the third gate driving output transistor is electrically coupled to the second pull-down node; a drain electrode of the third gate driving output transistor is electrically coupled to the gate driving signal output terminal; a source electrode of the third gate driving output transistor is electrically coupled to the first low-voltage terminal.

16. A gate driving method applied to the gate driving unit according to claim 1, comprising:
under control of a potential of the pull-down node, controlling, by the pull-up node denoising circuit, coupling or decoupling between the first pull-up node and the input terminal;
under control of a control voltage provided by the control voltage terminal, controlling, by the pull-down node control circuit, coupling or decoupling between the control voltage terminal and the pull-down node; and, under control of a potential of the second pull-up node, controlling, by the pull-down node control circuit, coupling or decoupling between the pull-down node and the input terminal;

under control of an anti-leakage control voltage provided by the anti-leakage control terminal, controlling, by the pull-up node control circuit, coupling or decoupling between the first pull-up node and the second pull-up node, and maintaining the potential of the second pull-up node.

17. A gate driving circuit, comprising:
multiple stages of gate driving units;
wherein each gate driving unit includes:
a pull-up node denoising circuit;
a pull-down node control circuit;
a pull-up node control circuit; and
an energy storage circuit;
wherein the pull-up node denoising circuit is electrically coupled to an input terminal, a pull-down node and a first pull-up node, respectively; the pull-up node denoising circuit is configured to, under control of a potential of the pull-down node, control coupling or decoupling between the first pull-up node and the input terminal;
wherein the pull-down node control circuit is electrically coupled to a second pull-up node, the pull-down node and the input terminal, respectively; the pull-down node control circuit is configured to, under control of a control voltage provided by a control voltage terminal, control the potential of the pull-down node; and under control of a potential of the second pull-up node, control coupling or decoupling between the pull-down node and the input terminal;
wherein the pull-up node control circuit is electrically coupled to an anti-leakage control terminal, the first pull-up node and the second pull-up node, respectively; the pull-up node control circuit is configured to, under control of an anti-leakage control voltage provided by the anti-leakage control terminal, control coupling or decoupling between the first pull-up node and the second pull-up node, and configured to maintain the potential of the second pull-up node;
wherein the energy storage circuit is electrically coupled to the second pull-up node and is configured to store electric energy,
wherein the pull-down node includes a first pull-down node and a second pull-down node; and the pull-up node denoising circuit includes a first pull-up node denoising transistor and a second pull-up node denoising transistor; a control electrode of the first pull-up node denoising transistor is electrically coupled to the first pull-down node; a first electrode of the first pull-up node denoising transistor is electrically coupled to the pull-up node; a second electrode of the first pull-up node denoising transistor is electrically coupled to the input terminal; a control electrode of the second pull-up node denoising transistor is electrically coupled to the second pull-down node; a first electrode of the second pull-up node denoising transistor is electrically coupled to the pull-up node; and a second electrode of the second pull-up node denoising transistor is electrically coupled to the input terminal.

18. The gate driving circuit according to claim 17, wherein each gate driving unit further includes a carry-signal output circuit and a gate driving signal output circuit;
the carry-signal output circuit is electrically coupled to the second pull-up node, a clock signal terminal, the pull-down node, a carry-signal output terminal and a first low-voltage terminal, respectively; the carry-signal output circuit is configured to, under control of the potential of the second pull-up node, control the carry-signal output terminal to be electrically coupled to the clock signal terminal, and, under control of the potential of the pull-down node, control coupling or decoupling between the carry-signal output terminal and the first low-voltage terminal;

the gate driving signal output circuit is electrically coupled to the second pull-up node, the clock signal terminal, the pull-down node, the gate driving signal output terminal, and a second low-voltage terminal, respectively; the gate driving signal output circuit is configured to, under control of the potential of the second pull-up node, control the gate driving signal output terminal to be electrically coupled to the clock signal terminal, and, under control of the potential of the pull-down node, control coupling or decoupling between the gate driving signal output terminal and the second low-voltage terminal;

a first low-voltage provided by the first low-voltage terminal is less than a second low-voltage provided by the second low-voltage terminal;

wherein the input terminal of each gate driving unit is electrically coupled to the carry-signal output terminal of an adjacent upper-level gate driving unit.

19. A display device, comprising:
a gate driving circuit including multiple stages of gate driving units;
wherein each gate driving unit includes:
a pull-up node denoising circuit;
a pull-down node control circuit;
a pull-up node control circuit; and
an energy storage circuit;
wherein the pull-up node denoising circuit is electrically coupled to an input terminal, a pull-down node and a first pull-up node, respectively; the pull-up node denoising circuit is configured to, under control of a potential of the pull-down node, control coupling or decoupling between the first pull-up node and the input terminal;
wherein the pull-down node control circuit is electrically coupled to a second pull-up node, the pull-down node and the input terminal, respectively; the pull-down node control circuit is configured to, under control of a control voltage provided by a control voltage terminal, control the potential of the pull-down node; and under control of a potential of the second pull-up node, control coupling or decoupling between the pull-down node and the input terminal;
wherein the pull-up node control circuit is electrically coupled to an anti-leakage control terminal, the first pull-up node and the second pull-up node, respectively; the pull-up node control circuit is configured to, under control of an anti-leakage control voltage provided by the anti-leakage control terminal, control coupling or decoupling between the first pull-up node and the second pull-up node, and configured to maintain the potential of the second pull-up node;
wherein the energy storage circuit is electrically coupled to the second pull-up node and is configured to store electric energy;

wherein each gate driving unit further includes a carry-signal output circuit and a gate driving signal output circuit;

the carry-signal output circuit is electrically coupled to the second pull-up node, a clock signal terminal, the pull-down node, a carry-signal output terminal and a first low-voltage terminal, respectively; the carry-signal output circuit is configured to, under control of the potential of the second pull-up node, control the carry-signal output terminal to be electrically coupled to the clock signal terminal, and, under control of the potential of the pull-down node, control coupling or decoupling between the carry-signal output terminal and the first low-voltage terminal;

the gate driving signal output circuit is electrically coupled to the second pull-up node, the clock signal terminal, the pull-down node, the gate driving signal output terminal, and a second low-voltage terminal, respectively; the gate driving signal output circuit is configured to, under control of the potential of the second pull-up node, control the gate driving signal output terminal to be electrically coupled to the clock signal terminal, and, under control of the potential of the pull-down node, control coupling or decoupling between the gate driving signal output terminal and the second low-voltage terminal;

a first low-voltage provided by the first low-voltage terminal is less than a second low-voltage provided by the second low-voltage terminal;

wherein the input terminal of each gate driving unit is electrically coupled to the carry-signal output terminal of an adjacent upper-level gate driving unit, wherein the pull-down node includes a first pull-down node and a second pull-down node; and the pull-up node denoising circuit includes a first pull-up node denoising transistor and a second pull-up node denoising transistor; a control electrode of the first pull-up node denoising transistor is electrically coupled to the first pull-down node; a first electrode of the first pull-up node denoising transistor is electrically coupled to the pull-up node; a second electrode of the first pull-up node denoising transistor is electrically coupled to the input terminal; a control electrode of the second pull-up node denoising transistor is electrically coupled to the second pull-down node; a first electrode of the second pull-up node denoising transistor is electrically coupled to the pull-up node; and a second electrode of the second pull-up node denoising transistor is electrically coupled to the input terminal.

\* \* \* \* \*